May 29, 1951 A. V. BEDFORD 2,554,693

SIMULTANEOUS MULTICOLOR TELEVISION

Filed Dec. 7, 1946 2 Sheets-Sheet 1

INVENTOR
Alda V. Bedford
BY H. S. Grover
ATTORNEY

May 29, 1951 A. V. BEDFORD 2,554,693

SIMULTANEOUS MULTICOLOR TELEVISION

Filed Dec. 7, 1946 2 Sheets-Sheet 2

INVENTOR
Alda V. Bedford
BY H. S. Grover.
ATTORNEY

Patented May 29, 1951

2,554,693

UNITED STATES PATENT OFFICE 2,554,693

SIMULTANEOUS MULTICOLOR TELEVISION

Alda V. Bedford, Princeton, N. J., assignor to Radio Corporation of America, a corporation of Delaware Application December 7, 1946, Serial No. 714,750

16 Claims. (Cl. 178—5.2)

Figure 1:
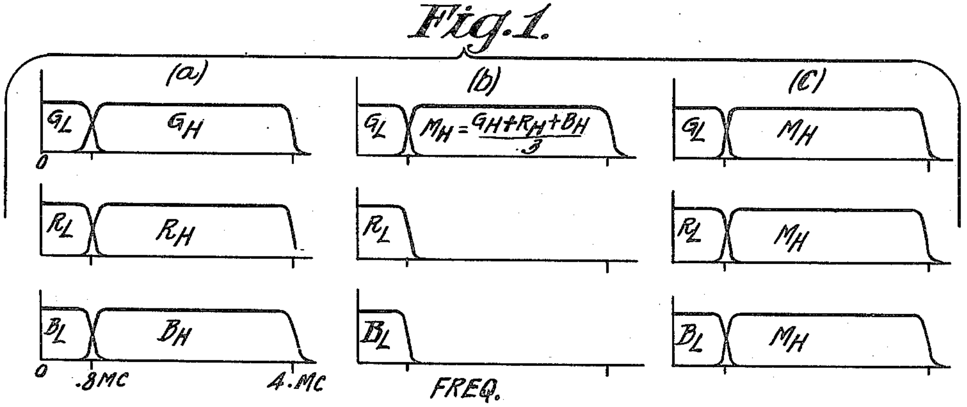

This invention relates to multicolor television systems and it is particularly directed to a system and method whereby the band width or frequency spectrum required to transmit the intelligence is reduced considerably over that heretofore considered necessary and, yet, this is accomplished without serious impairment of either picture quality or resolution of the image observed at receiving points.

Multicolor television systems have heretofore been considered on the basis of utilization of two methods of transmission, each of which requires a substantially like band width. One of these systems was the so-called sequential multicolor system whereby an optical image at the transmitter was scanned in sequentially repeating fields of progressively different component or primary colors. Each of the selected colors into which the image field was analyzed was chosen as one of the component or primary colors which additively would combine to produce white light. Thus, the component colors usually selected were red, green and blue and the sequence of field scansions was in any selected order, such as red, blue, green, repeated at a rate sufficiently high to nullify flicker and color fringe effects. Usually, the transmissions were carried on as double interlaced scannings so that six separate field scannings were required to reproduce a single image frame in three component colors, there being one field scanning for each color chosen for each of the odd and even lines of the image to be scanned or reproduced.

The frequency spectrum required for such transmission is approximately three times that required for an ordinary black and white monochrome transmission with equal detail and definition. By now accepted standards in the industry for black and white monochrome transmissions, an approximately 4.5 megacycles band width is required for transmitting adequate picture or image detail so that if color images are produced with the field frequency required to avoid objections as to flicker and color fringe effects, which means at a repetition rate of the order of three times that required for black and white monochrome transmissions it at once becomes apparent that the band width or frequency spectrum required for the color transmission is likewise approximately three times that required for black and white.

In order to effect the sequential form of transmission the camera tube at the transmitter point of the system which analyzes the optical image and, under the scanning operation, converts the optical image into electrical signals is usually arranged to receive the light of the image through a component color filter element in such a way that the camera tube is sequentially illuminated by the image light in the chosen different component colors by causing the image light to pass through the rotary or moving component color filter element prior to reaching the camera tube. Various methods to provide such a form of transmission are known and one illustrative form thereof is embodied and disclosed in the United States application of Otto H. Schade, Serial No. 376,770, filed January 31, 1941, for "Method and System for Developing Television Signals," now Patent No. 2,458,649, issued January 1, 1949.

At the receiver end of the system a generally similar type of component color filter and element is interposed between an image reproducing tube and the eye of the observer so that the observer sees the image which is reproduced under the control of the sequentially received component color signals so that that image becomes observable through the different component color filter elements in sequence. The various component colors of the image then are effectively added while being observed to produce at the receiver an image of the subject of the transmitter, which reproduced image shall appear in substantially natural color.

In another form of transmission system it has been proposed to transmit color representations of the subject in all of its color components simultaneously. This is done usually by providing separate camera tubes or separate color analyzers which, under scanning operations, bring about the production of separate signal trains each representing the image in one of the selected component colors, such as one of red, green or blue. Such systems, in the absence of compensating methods, would require the same band width for transmission as would the sequential method hereinabove explained. This comes about because of the fact that signals representing the image in three component colors are transmitted simultaneously, although the scanning occurs at a reduced rate which is usually one-third as fast as that for the sequential method but in view of the fact that three signals are being sent simultaneously, it will be appreciated that there is a like or substantially like band width required for transmission.

The disclosure of one form of system to transmit color television images simultaneously is illustrated, purely by way of example, in the December, 1946 issue of "Electronic Industries" at page 58 et seq. thereof.

Various proposals have been made whereby in simultaneous color television operations it is possible to reduce the band width required for such transmissions. Among these proposals is that generally set forth by Alfred C. Schroeder in his United States patent application, Serial No. 706,613, filed October 30, 1946, and entitled "Color Television Apparatus," now Patent No. 2,535,552, issued December 26, 1950. In the Schroeder arrangement provision has been made for saving a portion of the frequency spectrum and to accomplish this result, recourse has been taken to the fact that the resolution of the human eye for detail is generally considered as being least at the blue end of the visible spectrum and greatest at the green portion of the visible spectrum. Consequently, by transmitting image signals of which the band widths allotted for the different component colors are varied in accordance with the color being represented, it has been possible to reduce the frequency spectrum required for color television transmission.

The present invention has as its principal object that of transmitting the low frequency portion of each of the three tricolor signals in three separate channels simultaneously and also to transmit concurrently therewith a signal which represents the high frequency portion determined by the sum of the three separate tricolor signals into which the image is analyzed. A signal of this character may be termed a mixed high frequency signal and it may be combined for transmission with any one of the low frequency portions of the separate tricolor signals.

At the receiver end of the system a signal of this character, that is, one having a mixture of the high frequency components forming each of the separate tricolor signals, may be isolated from the low frequency components by means of filters and then subsequently added to each of the selected three low frequency signals to produce three completely new tricolor signals. These separate new signals may then be applied, respectively, to the three color reproducers, such as those illustrated, by way of example, in the mentioned publication, "Electronic Industries."

The invention has hereinabove generally outlined a proposal which takes recourse to the fact that the human eye is generally unable to distinguish color accurately when the areas involved are extremely small—that is, only a few times wider, or longer than the smallest element of black and white detail which can be resolved by the human eye at a like viewing distance. It has been found, as an example of the foregoing statement, that a resolution test pattern, such as is commonly used for testing television transmission circuits and which test pattern consists of alternate red bars and green bars of equal apparent brightness cannot be resolved by the human eye at a distance which is as great as that at which a similar pattern which consisted of alternate green and black bars, or, for example, a pattern consisting of alternate white and black bars could be resolved.

According to the foregoing, the present invention makes it possible to reproduce any sudden changes in apparent brightness without change in color as accurately as in an ideal high-fidelity television system. A system of the character herein to be described in more detail in what is to follow is such that if the color of the subject being televised changes abruptly in the scene, the change in color will naturally occur somewhat more slowly in the reproduction, but if the abrupt change in the color also comprises a change in the apparent brightness, this apparent change in brightness will be accurately reproduced as an abrupt change in apparent brightness.

Thus, it becomes an important object of the present invention to simplify television transmissions in color to such an extent that within an available frequency range it will become possible to accommodate more television transmitters sending the image or video signals in color than would otherwise be the case if methods of transmission heretofore used were adopted.

A further object of the invention is that of providing a television transmission system wherein substantially high-fidelity multicolor transmissions may be effected particularly by the simultaneous transmission method, while, at the same time, bringing about a considerable reduction in frequency band width necessary to realize the actual transmission.

Other objects and advantages of the invention will become apparent and suggest themselves to those skilled in the art when the accompanying drawings are considered together with the following specification.

Figure 2:
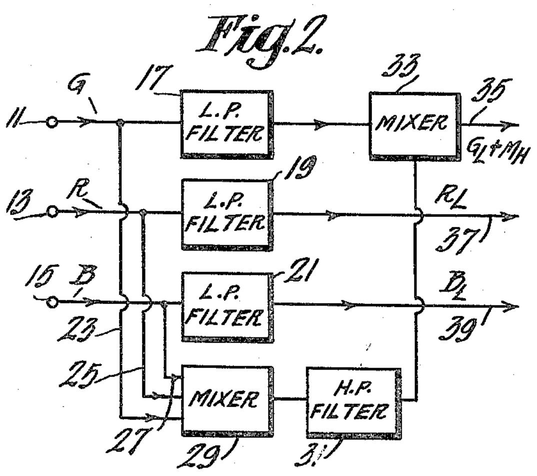
Figure 3:
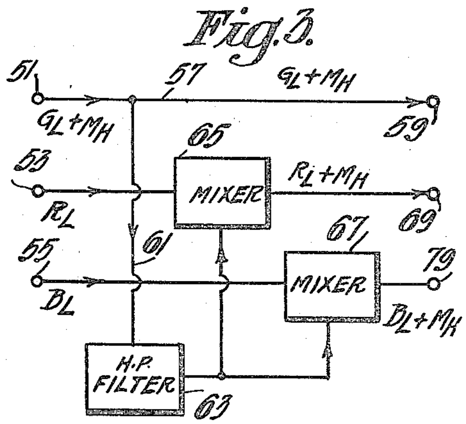
Figure 4:
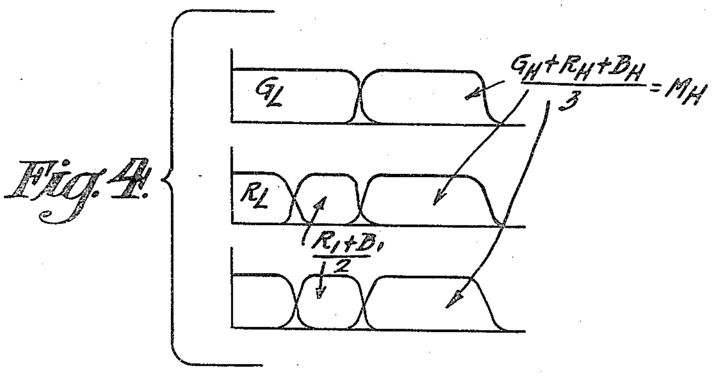
Figure 5:
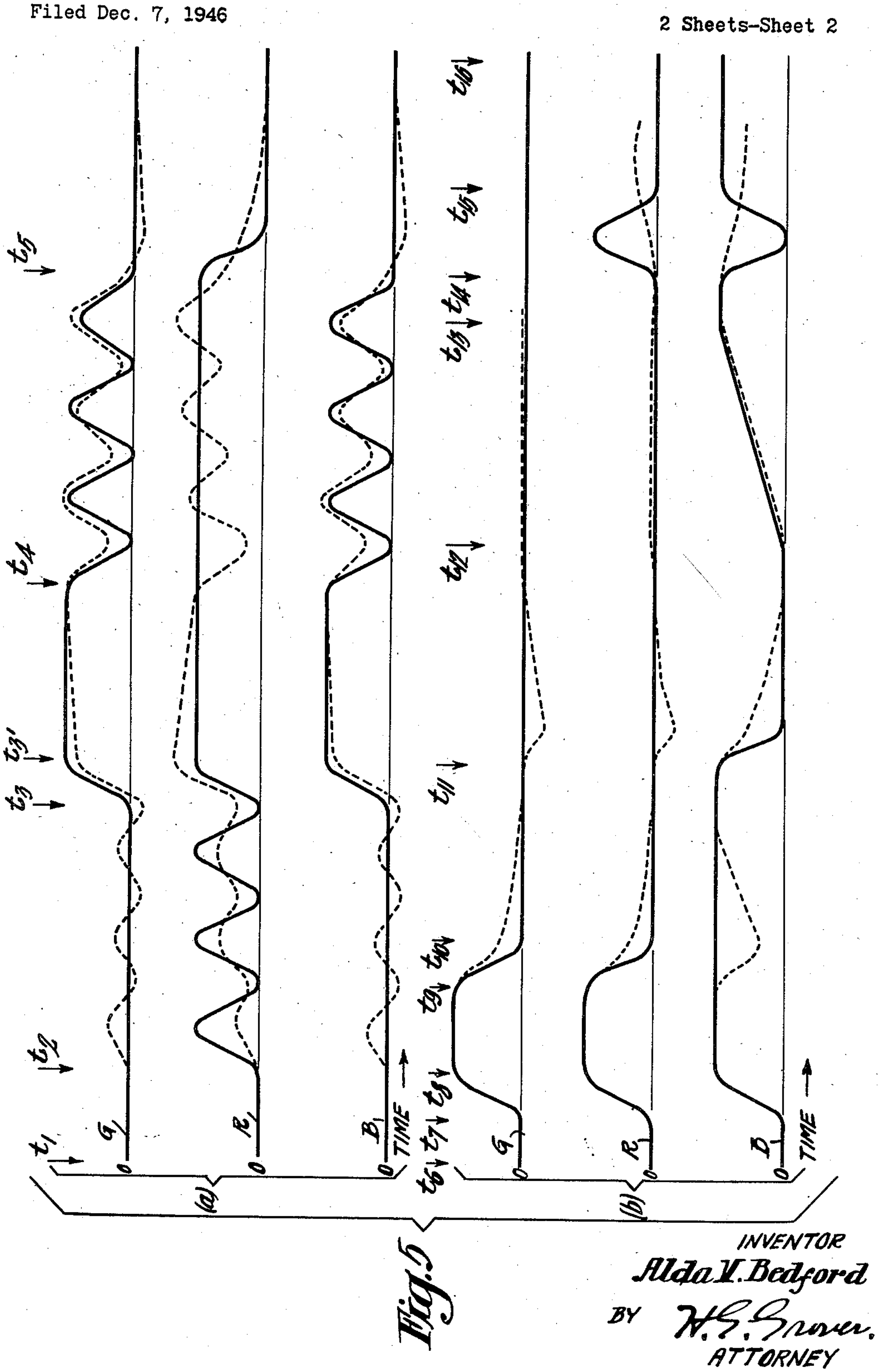

By the drawings, Fig. 1 is a group of curves wherein amplitude response in various component colors of the image scanned or analyzed are plotted as against the video frequency spectrum required for transmission. By the several curves of Fig. 1, portion (*a*) indicates the signals resulting due to scansion of the image at the transmission; portion (*b*) indicates the signals in the frequency range actually transmitted; and, portion (*c*) indicates the method whereby the image reproducers at receiving points are operated from the incoming signals;

Fig. 2 diagrammatically illustrates one form of transmitter circuit;

Fig. 3 diagrammatically illustrates one form of receiver circuit;

Fig. 4 is a group of curves illustrating a modification of the curves shown by Fig. 1; and Fig. 5 is a diagrammatic representation of the response of the receiver system to illustrative types of input signal waves.

Referring now to the drawings and first to Fig. 1, the various amplitude responses for the signals representing the different component colors of the image are shown as plotted against frequency or band width. On all of the curves and other portions of the drawing the letters G, R and B, respectively, indicate component colors green, red and blue. Similarly, the sub-letters L and H represent, respectively, a low-frequency range and a high-frequency range of the signals. The letter M shown by these curves represents the additive mixture of signals representing such individual component colors as are actually present in the signal at any time.

Thus, it can be seen from a consideration of portion (*a*) of Fig. 1 that the curve $G_L$ indicates the low-frequency response of an assumed green component color signal, and the curve $G_H$ correspondingly represents the high-frequency components of the same component color signal. Curves representing the red and blue components are likewise identified. In the portion (*b*) of Fig. 1 there is represented again the low-frequency component responses for the green, red and the blue component color signals. These various signals in a simultaneous system are all concomitantly transmitted to receiving and/or monitoring points.

In addition, however, in portion (b) of Fig. 1 the curve designated $$M_H=\frac{G_H+R_H+B_H}{3}$$

represents the sum of all of the three tricolor signals of the green, red and blue component colors in the high-frequency range with the amplitude of the signals in this range being reduced to an indicated value of one-third that which would normally be expected by adding together $G_H$, $R_H$ and $B_H$ of portion (a) of Fig. 1. Thus, it becomes apparent from curve (b) of Fig. 1 that the first channel, assumed herein to be the green, may be transmitted to include the low-frequency green component color signals and signals representing the summation of all three of the tricolor signals in the higher frequency range. This signal transmission is then accompanied by signals representing the low frequency components of the red and the blue component colors transmitted over separate signal channels either through the use of main carriers or subcarriers. The actual transmission may, though not necessarily, follow methods already proposed in the above-mentioned application of Alfred C. Schroeder, Serial No. 706,613, now Patent No. 2,535,552, issued December 26, 1950 or in the application of Gordon L. Fredendall, Serial No. 714,266, filed December 5, 1946 and entitled "Color Television Transmitter," now Patent No. 2,513,159, issued June 27, 1950.

Now referring for the moment to Fig. 2 of the drawings, it will be observed that at the input terminals 11, 13 and 15, respectively, signals representative of the red, the green and the blue component colors developed at any suitable form of image analyzer, or camera tube, may be supplied preferably after the signals have been suitably amplified for transmission. Any detailed description of the form of image analyzer and the like is believed unnecessary at this point in that any three suitable scanning units to which like images are directed but which images are analyzed in different component colors may be provided. A suitable form of analyzing arrangement is shown in the application of this inventor, A. V. Bedford, filed December 5, 1946 and entitled "Television System" and having Serial No. 714,322, although for the purpose of this present invention it is to be understood in referring to the last-mentioned application that the various camera tubes there shown may be assumed to scan the image in substantially equal detail in all colors. Alternatively, the form of pickup and signal source may be, as disclosed in the mentioned publication "Electronic Industries" for December 1946. Still other methods may be used where desired and provided the signal sources provide the desired three separate input signals herein specified as representative individual component color signal series of the image.

Under the circumstances, the various signals supplied at terminals 11, 13 and 15 are then each passed through low-pass filters 17, 19 and 21 which may be of any appropriate design so long as they are generally arranged to cut off in the general region of the indicated cut off point shown by the curve $G_L$, $R_L$ or $B_L$ at Fig. 1 for the representative example. Filters of either the low-pass, the high-pass or the band-pass type are so well known and have been so thoroughly explained in all their various embodiments in the text "Transmission Networks and Wave Filters" by T. E. Shea, published by D. Van Nostrand Co. Inc. in 1929, as to make it unnecessary to include any illustration thereof at this point. Likewise, all of the signals supplied at the input terminals 11, 13 and 15 are applied through conductors 23, 25 and 27 to a mixer unit 29 which may consist of one or more tubes to the input of which all signals are concurrently applied with the result that all input signals are mixed and added, and in the output of the mixer, the composite signal representative of all component colors appears. A signal of this type is generally represented by the portion shown at $M_H$ in part (b) of Fig. 2.

Since it was above explained that for the transmission of the mixture signal there would be added only the higher frequency components of all of the signals, the mixer output is fed to a high-pass filter generally described at 31 which passes those frequencies which are above the cutoff range of the low pass filters 17, 19 and 21. A high-pass filter of this type is likewise generally known and has been so well explained in the art by Shea and others as to make further explanation thereof at this point unnecessary.

The output from the high-pass filter 31 is then fed into the mixer 33 to which, for example, the signal output from the low-pass filter 17 is likewise supplied so that the output from the mixer 33, as it appears in conductor 35, will be, by way of example, of the general waveform represented by the curves $G_L$ and $M_H$ of portion (b) of Fig. 1. The outputs from the low pass filters 19 and 21 are then preferably supplied over conductors 37 and 39 to suitable output points and may be as generally marked at $R_L$ and $B_L$ in Fig. 1, for instance.

The output connections 35, 37 and 39 then may feed to separate transmitters, or to transmitter-modulators, as the case may be for transmission according to the methods of transmission explained in the above-mentioned Schroeder and/or Fredendall applications. Thus, the signals representative of the green component color in its low frequency range and of the mixture of all of the signals in the higher frequency range may modulate one main carrier, and the signals representative of the low-frequency components of the other two component color signals may then be caused to modulate either separate carriers properly spaced from the main carrier, or these signals may modulate separate subcarriers which, in turn, modulate the main carrier. In any case, proper side band filtering, as explained in the Schroeder, and/or Fredendall, applications, is important and should be adopted.

In connection with the filter design hereinabove suggested for the low pass filters 17, 19 and 21 and for the high pass filter 31, it should be borne in mind that these should be generally complementary in the sense that the low frequency components and the high frequency components derived from a single channel should be such that if added together the result would be a summation signal which would be identical to the original signal in frequency response, phase response and transit response.

Referring now to Fig. 3 of the system, it will be assumed, particularly for purposes of illustration, that at the input terminals 51, 53 and 55, signals are provided which have been received on suitable receiving instrumentalities, such, for example, as those disclosed by the United States patent application of Gordon L. Fredendall, filed December 5, 1946, as Serial No. 714,267, and entitled "Color Television Receiver," and, as such, the signals transmitted as direct modulations of the main carrier will be selected and separated from those which are transmitted as modulations of auxiliary carriers or as modulations of sub-carriers, which latter sub-carriers, in turn, modulate the main carrier. In the light of the disclosure in the last mentioned Fredendall application, it is believed that further illustration of these features will be unnecessary except to mention that at the input terminal 51 it will be assumed that the input signal there derived is one of the character represented on the curve series (b) of Fig. 1 as the combination of wave forms $G_L$ and $M_H$, while the signals received at the input terminals 53 and 55 will be assumed to be signals of the general form represented on the curve series (b) of Fig. 1 by the letters $R_L$ and $B_L$.

Considering now the curve series (c) of Fig. 1, it will be appreciated that if the transmission is of the character hereinabove described whereby the color sense is transmitted substantially in the low frequency range, and the detail or delineatory characteristics of the image are transmitted as a combination of the several signals or, in other words, as substantially a black and white monochrome signal which will be a measure of intensity and image brightness, although not its color (which color is derived from the transmitted low frequencies), it will be appreciated that the reproduced image as finally viewed and produced for each component color representation should include not only the component color but, also, the detail included in the image. Accordingly, the signals received at the input terminal 51 are applied both along a conductor 57 to an output terminal point 59 (later to be referred to more particularly) and also along a second conductor 61 to a suitable high pass filter 63. The signals received at the input terminals 53 and 55 are applied directly therefrom to the mixer units 65 and 67. Along with these signals in the mixer units 65 and 67, as the case may be, there is applied to the input of the mixers 65 and 67 the output signals from the high pass filter unit 63. The output from the mixers 65 and 67 is then passed to output terminals 69 and 79.

The high pass filter 63 is of generally similar character to the high pass filter 31 described in connection with the transmitter end of the system and its function is to cut off all frequencies which have been illustrated and explained hereinabove as being in the so-called low frequency or color establishing range but the filter 63 is designed to transmit those signals which are indicated as being in the so-called high frequency or intensity or brightness indicating range. In this sense, the output of the filter 63, having supplied to its input the signals indicated on portion (b) of Fig. 1 as the wave form $G_L$ and $M_H$, will include only the portion of the input which is represented beneath the curve $M_H$. These signals shown as $M_H$ represent now the high frequency components of the scanned image at the transmitter point and, as explained, include the high frequency components representative of the composite all of the red, the green and the blue. Thus, the output of the high pass filter 63 is applied to the mixer unit 65 input along with the low frequency components of the "red" signal. This may be accomplished by applying the signal at the terminal 53 to the input electrode of an amplifier tube whose plate is connected in parallel with a second amplifier tube to whose input circuit the output from the high pass filter 63 is applied. These tubes may or may not provide any amplification, depending upon whether or not any amplifying stages are included in the connection channel between the input terminal 51 and the output terminal 59 for the assumed green signal.

Similarly, the output of the high pass filter 63, including the high frequency components, is combined with the low frequency components of the assumed "blue" signal received at the terminal 55 at the input of the mixer 67. The mixer unit 67 is of generally similar character to that explained with respect to the mixer 65. The output signal from the mixer 67 becomes available at terminal 79. At each of the terminal points, by letter G, R or B designations, the type of signal there available has been shown.

While the drawing diagrammatically sets forth the invention for the purposes of simplifying the explanation, it will be understood that the signal available at the terminals 59, 69 and 79, respectively, may be used now to modulate and control an image reproducing tube, such as separate kinescopes, for instance, to bring about the image reproduction in appropriate color of the image scanned at the transmitter. Various ways of combining the separate images for observation are known and have already been explained in the art so that further illustration of such a method herein is deemed unnecessary, although, if desired, reference may again be made to the disclosure of an illustrative method which was explained in the already mentioned publication, "Electronic Industries." In any event, if the signals are brought to three separate image producing kinescopes each producing an image f or viewing in one component color and these separate images are then registered on a separate observation screen, it will be apparent that an additive tricolor image appears in the plane of image registry where all all of the various images are brought into viewing position.

The invention hereinabove explained sets forth the general principle of transmitting the various signals indicating color representations as low frequency modulations and the combination signal as the high frequency modulations which provides the image detail and intensity. However, various other methods whereby these general results may be accomplished are possible and one such modification is diagrammed by the several curves of Fig. 4 which, likewise, plot response versus band width. In Fig. 4, the upper curve indicates that the green component color signal shall occupy a greater band width than does the assumed red and blue component color signal. The composite signal represented as $M_H$ will occupy substantially half the total band width required for each separate color transmission and, likewise, in the spectrum intervening between the low frequency representation of the assumed red and blue component color signals and the mixture signal, there is provided a further signal representing only the mixture of the red low frequency components and the blue low frequency components. In connection with the mixture signals, it is, of course, to be appreciated that the actual amplitude of the signals represented is of the order of one-third that normally resulting from the combination of equal brilliance signals in all separate component colors and in connection with the combination of the two signals for red and blue, the signal is similarly reduced.

By the modification of Fig. 4, some further transmitter modifications will naturally be required but it is believed that it will be completely clear in the light of what has been stated above as to how this may be brought about. Suffice it to say, for the moment, that the arrangement of Fig. 4 favors the green signal by providing a wider low-pass-band than for the red and the blue, due to the fact that the eye has greatest acuity for green, as was explained in the mentioned Schroeder application.

Figure 5 of the drawings illustrates diagrammatically the response of a system of the type diagrammed in Figs. 2 and 3 with its operation carried out in accordance with the principles explained by the several sets of curves of Fig. 1. In Fig. 5, the solid lines represent the input tricolor waves and the dotted lines indicate the general response of the system in each of the several selected component colors for the different input tricolor waves.

If reference is now made to part (a) of Fig. 5 and note is made of the fact that the letters G, R and B are intended to represent green, red and blue, respectively, it will be appreciated that starting at time $t_1$ all of the green, red and blue are of zero amplitude corresponding, for instance, to a black area of the scene. At the time $t_2$ it will be appreciated that the red signal starts a series of sinusoidal rises and falls, while the green and blue signals are assumed to remain at zero level. This condition occurring at the time $t_2$ will correspond to the scanning of vertical red and black strips having a spacing corresponding to the top frequency of the video pass band so that only a sine wave is passed by the conventional high fidelity system. The curves show by the dotted outlines that in the system hereinabove described the assumed blue and green image reproducers will actually give some light during the peaks of the red signal, but the peaks of the red are higher than the green and blue peaks although not actually as high as the peaks of the solid line red curve which, for purposes of explanation, is considered to be ideal. This means that the red and black strips will actually appear in the composite reproduced image as red and black strips but the red will actually have a lower chroma due to having some of the green and blue mixed therewith.

Starting now at time $t_3$, the signal input is assumed to become all white. The various dotted curves gradually reach coincidence with the solid curves at the time $t_4$, with the interval between the time $t_3$ and $t_4$ being the maximum time of rise of all signals when limited by the indicated low pass filters. The shortest time of rise of the signals from the high pass circuits is shown by the interval between the time periods $t_3$ and $t_{3'}$ and it will be seen that this is approximately ⅕ as long as the time of rise of the solid curves from times $t_3$ to $t_4$. This is due to the high frequency and the low frequency pass bands together being, with the assumed example of Fig. 1, for instance, five times as wide as the low frequency bands. From the curves of Fig. 5 it will also be noted that the reproduced picture will be generally, for the illustrated example, excessively red in the early part of the interval of time between time $t_3$ and time $t_4$, but in actual observation, this effect will not actually be detrimental to the picture because of the smallness of the actual area represented and because of the limited resolving power of the eye.

Continuing now from the time $t_4$ to the time $t_5$, it will be assumed that the scene consists of alternate vertical red and white bars or stripes or dots or checks and the representations will be generally as diagrammed.

From the time $t_5$ through to the time $t_7$, (which latter time is shown by portion (b) of Fig. 5) it will be assumed that the picture area is all black and that it suddenly becomes abruptly white at the time $t_8$. Under these circumstances, since all three signals representative of the green, red and blue are changing alike, the actual reproduction will follow the ideal curve.

In the diagrammed representation of Fig. 5, it has been assumed that in the time period between the time marked $t_9$ to the time $t_{11}$ the actual scene to be transmitted is blue in the region of the time $t_{10}$. It is noted that the reproduced apparent brightness, that is the total luminosity, is ideal but it is grayish instead of true blue color. The true and correct blue color is reached at the time $t_{11}$. This is actually an extremely short time and, consequently, like that above mentioned with respect to red and covering the time period $t_3$, to $t_4$, the off-color effect will not either be noticed or objectionable. In the time period $t_{11}$ to $t_{12}$ the scene is black and then from $t_{12}$ to $t_{13}$ it gradually becomes blue. In the time period $t_{14}$ to $t_{15}$ there is a narrow red area after which the scene becomes blue at time $t_{16}$.

From the foregoing, it will be appreciated that the sum of the dotted green, red and blue curves is always equal to the sum of the three solid curves. This insures optimum and ideal reproduction in apparent brightness or luminosity with the possible exception of those few cases where the dotted curves swing below zero which implies the need of negative light which is not achieved.

Under the foregoing explanation, if it be assumed for purposes of illustration only, that the conventional color television system requires three 4 mc. bands, the total band width (neglecting guard bands and the like) which will be required would be 12 mc. According to the foregoing explanation, with conditions assumed as diagrammed by Figs. 1 and 5, the total band width required would be only 5.6 mc. (neglecting, of course, allowance for transmission of the vestigial side band on the other side of the carrier and for any sound accompaniments). If this should be proved unduly narrow and deteriorate the quality of the transmission because of the lack of adequate high frequency detail, it will be appreciated that the effect of higher detail may readily be achieved by expanding slightly the overall band widths required (for instance by expanding the assumed 4 mc. band to 6 mc. and then confining the low frequency transmissions to the area between the zero and 1.2 mc.). This would provide extremely high quality transmission and yet the overall band width required, neglecting guard bands and the like, would still be reduced to a space such as to occupy only 8.4 mc. as compared to 12 mc. heretofore thought necessary.

The invention hereinbefore described has been set forth particularly with relationship to a tricolor transmission. It is, however, to be understood that the same general principles may be carried out in connection with the bicolor transmission method where adequate color rendition can be had by bicolor methods. Also, it is to be understood that, where desired and under some conditions of operation, recourse may be had to separate image analyzing elements for producing the component color signals and still a further synchronously operating scanning instrumentality also functioning in like phase relationship to the color analyzers may be relied upon for producing substantially a black and white monochrome signal output representative of the scanned image subject. Under such circumstances, the low frequency components of the produced black and white signal will be separated from the high frequency components and the high frequency components that are left will be transmitted as the intensity control signal herein identified as occupying the spectrum portion marked $M_H$, as in Fig. 1. Likewise the high frequency components resulting from the separate color analysis will be attenuated and the low frequency components corresponding to those designated in Fig. 1 by the letters $G_L$, $R_L$, $B_L$ will be attenuated so that the low frequency components only need be transmitted from the separate component color analyzers.

Having now described the invention, what is claimed and desired to be secured by Letters Patent is the following:

1. In color television transmission system, the method steps comprising scanning an object to produce a plurality of individual sets of signals each representative of the image in brightness variations of a particular one of a plurality of selected discrete component colors, deriving from each of the produced sets of signals a new signal series occupying a restricted relatively narrow frequency band, inclusion of only the low frequency signal components of the related component color signal set, deriving a combined composite signal proportional in band width within predetermined limits to only the higher frequency components of at least two of the produced component color signal sets, and transmitting all of the derived signals.

2. In color television transmission apparatus, means for producing a plurality of individual sets of basic signals, each representative of the image in brightness variations of a particular one of a plurality of selected discrete component colors into which the image being televised is scanned and each set of signals having low frequency components and high frequency components, means for deriving from each of the produced sets of signals a new signal series occupying a predetermined restricted frequency band, said new signal sets being representative of said basic signal low frequency components, means for deriving a signal proportional in band width within predetermined limits to only the higher frequency components of at least two of the basic signal sets, and means for transmitting the signals derived from the higher frequency components of at least the two selected signal sets concomitantly with predetermined series of derived frequency restricted new signals.

3. In color television transmission apparatus, means for producing a plurality of individual sets of basic signals each representative of an image in brightness variations of a particular one of a plurality of selected discrete component colors into which the selected image is scanned, low pass filter means for deriving from each of the produced sets of basic signals a new signal series occupying a reduced frequency band as compared to the initially produced signals, a mixer and high pass filter means for deriving from the group of originally produced basic signals a composite signal including only the higher frequency components of at least two of the selected component color basic signals, and means for transmitting the derived new signals concomitantly with the derived composite high frequency signal.

4. In color television transmission apparatus, means for producing a plurality of individual sets of basic signals each representative of an image in brightness variations of a particular one of a plurality of selected discrete component colors into which the selected image is scanned, low pass filter means for deriving from each of the produced sets of basic signals a new signal series occupying a reduced frequency band as compared to the initially produced signals, a mixer and high pass filter means for deriving from the group of originally produced basic signals a composite signal including only the higher frequency components of at least two of the selected component color basic signals, and means for concomitantly transmitting the derived composite high frequency signal with the derived new signal series corresponding to a particular basic signal set.

5. A color television system which comprises means for analyzing an optical image to produce a plurality of trains of signals each representing the optical image in brightness variations of one of a plurality of discrete selected component colors with each of the signal energy trains occupying substantially like frequency ranges, low pass filter elements for separating from each of the plurality of trains of signal energy a substantially restricted frequency band including only the lower frequency signals of the corresponding train thereby to produce control color indicia signals, a mixer circuit for combining each of the initially produced trains of signal energy to generate a mixture signal representing all of the component colors developed, filter means for selecting the high frequency components only from the mixture signal to provide a train of detail indicia signals indicative of overall image detail, and means for transmitting all of color indicia and the detail indicia signals.

6. The apparatus claimed in claim 5, comprising, in addition, means to combine the detail indicia high frequency range signal and one of the color indicia signals in substantially adjacent frequency relationship prior to transmission.

7. In television reception the method of reproducing images in substantially natural color comprising receiving sets of color indicia signals each of relatively narrow and low frequency range and each representative of brightness variation in a particular one of a plurality of discrete component colors and also receiving detail indicia signals of relatively high frequency range and which are substantially non-overlapping in frequency as compared to the discrete color indicia signals, supplying both the detail indicia signals and one of the discrete color indicia signals concurrently to one of a plurality of signal channels, mixing the detail indicia signals separately with each of the received discrete color indicia signals and then supplying the mixed signals to separate signal channels, and reproducing an electro-optical image in color under the control of all of the signals appearing in each of the separate signal channels.

8. A television receiver for reproducing images in substantially natural color comprising means to receive a plurality of color indicia signal sets each of relatively narrow and low frequency range and each representative of brightness variation in a particular one of a plurality of discrete component colors said means also being adapted to receive an accompanying detail indicia signal of relatively high frequency range and substantially non-overlapping in frequency as regards to the set of color indicia signals, means for supplying the detail indicia signals and one of the color indicia signals concurrently to one signal channel, means for mixing the detail indicia signals only with the color indicia signals in each of the other channels, and means for supplying the channel signals to a plurality of image reproducers.

9. A television receiver for reproducing images in substantially natural color comprising means to receive a plurality of color indicia signal sets of relatively narrow and low frequency range each representing a subject in brightness variations of one of a plurality of discrete component colors, means for concurrently receiving detail indicia signals of relatively high frequency range and which are substantially non-overlapping in frequency range as compared to the color indicia signals, means for supplying the detail indicia signals and one of the color indicia signal sets concurrently to a first signal channel, means for mixing the detail indicia signals with each of the other color indicia signal sets received in each of a plurality of separate signal channels, and means for supplying each of the mixed signals and color indicia signals in the said separate channels and the signals in the first signal channel to a plurality of image reproducers to convert the signals into electro-optical image in color.

10. A color television receiver adapted for receiving and reproducing television images in colors simulating those of a subject at a point of transmission which comprises means for receiving signals occupying a relatively wide frequency band and including both low definition color indicia of a particular one of a plurality of separate discrete component colors of the image and accompanying high definition detail indicia common to all component colors, means for receiving at least one other low definition color indicia signal occupying only a relatively narrow frequency band as compared to the combined band width of the low definition color indicia and high definition detail indicia signals received in the first named channel, filter means for deriving from the first received color and detail indicia signals only the high definition detail indicia signals, and means for combining the derived high definition detail indicia signals with the separately received low definition color indicia signals whereby each received low definition color indicia signal is adapted to produce low definition color indications with the received image signals and the high definition detail indicia signals and like detail indicia signals control the detail with which each low definition color signal is reproduced.

11. A tricolor television receiver adapted for receiving and reproducing television images in colors simulating those of a subject at a point of transmission which comprises means for receiving signals occupying a relatively wide frequency band and including both a narrow frequency band of low definition color indicia signals of a particular one of a plurality of discrete component colors of the image, said means being adapted to receive an accompanying relatively wide band high definition detail indicia signals common to all discrete component colors, means for receiving a pair of other low definition color indicia signals each occupying only a relatively narrow frequency band of the same order of band width as is occupied by the last mentioned low definition color indicia signals, filter means for deriving from the first received low definition color and high definition detail indicia signals only the detail indicia signals, means for combining the derived detail indicia signals with the separately received color indicia signals, and means to supply the so combined color indicia signals and the detail indicia signals and the wide frequency band color indicia and detail indicia to image reproducing apparatus to produce color indications under the control of the image signals with the image detail in each color substantially identical.

12. In a color television transmission apparatus the combination of: means for scanning a color object to produce a plurality of individual sets of basic color signals each set representing brightness variations of a particular color component of the scanned object; means for separating each set of basic color signals into low and high frequency signal components; means for producing a plurality of secondary color signal sets each respectively inclusive of low frequency components corresponding to a corresponding basic signal set; means for mixing high frequency components corresponding to a plurality of said basic signal sets; and means for concomitantly translating over a plurality of separate channels said secondary color signals and said mixed high frequency components.

13. In a color television transmission apparatus the combination of: means for scanning a color object to produce a plurality of individual sets of basic color signals each set representing brightness variations of a particular color component of the scanned object; means for separating each set of basic color signals into low and high frequency signal components; means for producing a plurality of secondary color signals sets each respectively inclusive of low frequency components corresponding to a corresponding basic signal set; means for mixing high frequency components corresponding to a plurality of said basic signal sets; means for combining the so mixed high frequency components with at least one secondary color signal set; and means for concomitantly translating over a plurality of separate channels said secondary color signals and said mixed high frequency components.

14. In a color television system the method of electrically representing a color object comprising the steps of: scanning the object to produce a plurality of individual sets of basic color signals each individual set representing brightness variation in a particular color component of the scanned object; dividing each set of basic color signals into low and high frequency signal components; producing a plurality of secondary color signal sets each secondary set representing the low frequency components only of a corresponding set of primary color signals; mixing the high frequency components of a predetermined number of said basic signal sets; and concomitantly communicating all of said secondary color signals with said mixed high frequency components to electrically represent predetermined color aspects of the scanned color object.

15. In a color television system, the method of electrically representing a color object comprising the steps of: scanning the object to produce a plurality of individual sets of basic color signals each individual set representing brightness variations in a particular color component of the scanned object; dividing each set of basic color signals into low and high frequency signal components; producing a plurality of secondary color signal sets each secondary set representing the low frequency components only of a corresponding set of primary color signals, mixing the high frequency components of a predetermined number of said basic signal sets; combining the so mixed high frequency components with at least one secondary color signal set; and concomitantly communicating all of said secondary color signals with said mixed high frequency components to electrically represent predetermined color aspects of the scanned color object.

16. In a color television system, the method of electrically representing a color object comprising the steps of: scanning the object to produce a plurality of individual sets of basic color signals each individual set representing brightness variations in a particular color component of the scanned object; dividing each set of basic color signals into low and high frequency signal components; producing a plurality of secondary color signal sets each respectively inclusive of low frequency components corresponding to a respective primary signal set; mixing the high frequency components of a predetermined number of said basic signal sets; combining the so mixed high frequency components with at least one secondary color signal set; and concomitantly communicating all of said secondary color signals with said mixed high frequency components to electrically represent predetermined color aspects of the scanned color object.

ALDA V. BEDFORD.

REFERENCES CITED

The following references are of record in the file of this patent:

UNITED STATES PATENTS

| Number | Name | Date |
| --- | --- | --- |
| 2,335,180 | Goldsmith | Nov. 23, 1942 |
| 2,375,966 | Valensi | May 15, 1945 |
| 2,406,760 | Goldmark | Sept. 3, 1946 |